Nov. 4, 1930.                 C. M. MANLY                 1,780,306
                              VEHICLE TIRE
                           Filed May 21, 1928
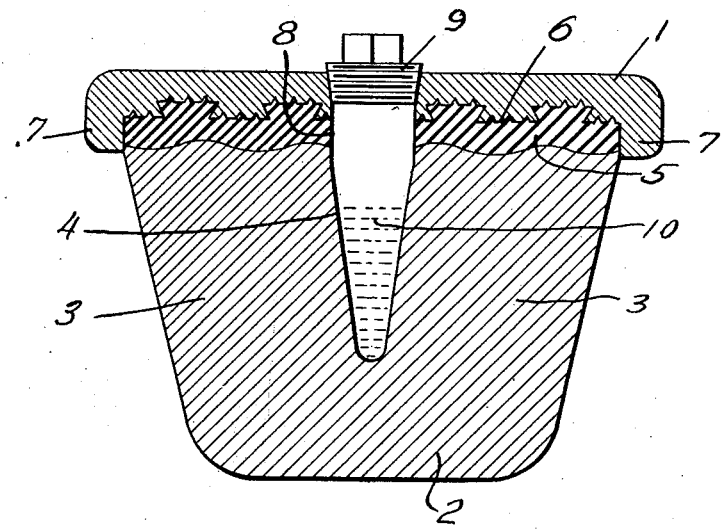
Inventor:
Charles M. Manly, Deceased
by John M. Manly,
Basil M. Manly, and
William G. Manly,
Executors.
BY
ATTORNEY Patented Nov. 4, 1930

1,780,306

UNITED STATES PATENT OFFICE

CHARLES M. MANLY, DECEASED, LATE OF KEW GARDENS, NEW YORK, BY JOHN M. MANLY, OF CHICAGO, ILLINOIS, BASIL M. MANLY, OF WASHINGTON, DISTRICT OF COLUMBIA, AND WILLIAM G. MANLY, OF COLUMBIA, MISSOURI, EXECUTORS, ASSIGNORS TO OVERMAN CUSHION TIRE COMPANY, INC.

VEHICLE TIRE

Application filed May 21, 1928. Serial No. 279,580.

This invention relates to vehicle tires and aims to produce a tire which may be subjected to long and severe use without deterioration of the rubber of which it is composed.

A tire embodying the invention has a rubber body containing a closed annular cavity into which the rubber may expand when the tire is compressed by loads or by road shocks. Sealed within this closed cavity is a tangible heat absorbing and heat transferring medium. This medium is preferably a liquid, such as water, capable of vaporization at a temperature below that at which rubber is devulcanized. The quantity of liquid is such that it does not completely fill the internal cavity but leaves sufficient free space therein to permit the rubber to expand into it when compressed by loads or road shocks. Consequently the liquid does not reduce the resiliency or cushioning effect of the tire. When the tire is in use the liquid serves to absorb the heat developed in the tire body and thus prevents any part of the tire body reaching a temperature sufficiently high to cause deterioration or devulcanizing. The heat absorbed by the liquid is either transferred to parts of the tire from which it may be conducted away, or in the case of heat caused by especially severe use of the tire over a short period, may be retained in the liquid and gradually dissipated through the tire body after the severe use has ended.

The invention is of especial value in connection with the type of tire described in the copending application filed February 28th, 1923, Serial No. 621,784, (Patent No. 1,678,866 dated July 31, 1928) of which the present application is a continuation in part. As an illustration, there is described an embodiment of the invention of such a tire, and reference is had to the accompanying drawing, which is a transverse section of such a tire, the tread being shown downward as in ground contact.

The tire illustrated in the drawing is a cushion tire made of rubber or rubber composition, and comprises a metal base-band of well known S. A. E. type, such as is at present almost universally used for solid tires of the pressed-on type, and a rubber tire body mounted on the outer periphery of the base-band and vulcanized thereto. The tire body comprises a tread portion 2 integrally uniting the two circumferentially continuous side members separated by a cavity 4 and united by vulcanization to the harder rubber base portions 5, which are in turn vulcanized as well as mechanically joined to the outer portions of the outer periphery of the aforesaid metal base-band 1 by the usual dovetailed grooves 6 and flanges 7 thereof.

The cavity 4 is annular and continuous and is enclosed by the rubber tire body and the middle portion of the outer periphery of the metal base-band. This cavity may be formed as described in my above mentioned copending application by means of a fusible cord which is withdrawn through one or more holes 8 in the base-band. It is to be particularly noted that a complete circumferential strip of metal base-band is exposed to the cavity 4 in the tire.

The hole or holes 8 are round and threaded and are hermetically sealed by threaded plugs 9 which do not protrude into the interior of the base-band after the tire is completed. A quantity of water or other tangible heat transferring medium insufficient completely to fill the cavity 4 is introduced into the cavity through the hole 8 and is sealed up in the cavity by the plug 9, thereby insuring an efficient conduction of the heat to the base-band from the inner face of the walls of the tire when said tire is in service. The increased removal of heat from the inner faces or walls of the tire reduces the deterioration of the tire which would otherwise result from excessive heat arising from excessive loading or from speeding.

It will be understood that this invention is not limited to the preferential embodiment herein described, but that it may be practiced through a wide range of equivalents, without departing from the scope and spirit of the appended claims.

What is claimed is:

1. A tire comprising in combination a metal base-band, a rubber tire-body vulcanized to the outer peripheral surface of said base-band, said tire being hollow with a closed circumferentially extending cavity formed between said rubber tire-body and said base-band; and a heat transferring liquid contained within said cavity to transfer the interior body heat to the base-band.

2. A tire comprising in combination a metal base-band, a rubber tire-body secured to the outer peripheral surface of said base-band, said tire being hollow with a closed circumferentially extending cavity formed between said rubber tire-body and said base-band; and a heat-transferring tangible freely flowing element contained within said cavity to transfer the interior tire-body heat to the base-band.

3. A tire comprising in combination a metal base-band containing a hole, a rubber tire-body vulcanized to the outer peripheral surface of said base-band and containing an annular cavity formed between said rubber tire-body and the base-band; a heat transferring liquid contained within said cavity to transfer the interior body heat to the base-band, and a tight closure for said hole sealing said liquid in the cavity.

In testimony whereof we have hereunto set our hands.

BASIL M. MANLY,
WILLIAM G. MANLY,
JOHN M. MANLY,
*Executors of the Last Will and Testament of Charles M. Manly, Deceased.*